(12) United States Patent
Hamburgen et al.

(10) Patent No.: US 9,166,437 B2
(45) Date of Patent: Oct. 20, 2015

(54) BATTERY PACK

(75) Inventors: William Hamburgen, Palo Alto, CA (US); Frank Hislop, Sunnyvale, CA (US); Brandon Harris, Palo Alto, CA (US); Aaron Leiba, San Francisco, CA (US); Srikanth Lakshmikanthan, Milpitas, CA (US)

(73) Assignee: Google Inc., Mountain View, CA (US)

( * ) Notice: Subject to any disclaimer, the term of this patent is extended or adjusted under 35 U.S.C. 154(b) by 865 days.

(21) Appl. No.: 13/358,036

(22) Filed: Jan. 25, 2012

(65) Prior Publication Data

US 2015/0207339 A1    Jul. 23, 2015

Related U.S. Application Data (60) Provisional application No. 61/436,555, filed on Jan. 26, 2011.

(51) Int. Cl.
*H02J 1/00* (2006.01)
*H02J 7/00* (2006.01)
*H01M 10/44* (2006.01)
*H01M 10/42* (2006.01)
*H01M 10/052* (2010.01)
*H01M 10/46* (2006.01)

(52) U.S. Cl.
CPC ............ *H02J 7/007* (2013.01); *H01M 10/052* (2013.01); *H01M 10/425* (2013.01); *H01M 10/441* (2013.01); *H01M 10/46* (2013.01); *H02J 7/0016* (2013.01); *H01M 2010/4271* (2013.01); *H01M 2220/30* (2013.01)

(58) Field of Classification Search
CPC ..... H02J 7/007; H02J 7/0016; H01M 10/052; H01M 10/425; H01M 10/441; H01M 10/46; H01M 2010/4271; H01M 2220/30
USPC .............. 307/71, 77; 320/116, 117, 126, 103, 320/110, 118–119
See application file for complete search history.

(56) References Cited

U.S. PATENT DOCUMENTS

| | | | |
|---|---|---|---|
| 7,598,706 B2 | 10/2009 | Koski et al. | |
| 7,880,434 B2 * | 2/2011 | White et al. | 320/119 |
| 2009/0289599 A1 | 11/2009 | White et al. | |
| 2010/0019724 A1 * | 1/2010 | Mizutani et al. | 320/118 |
| 2010/0213897 A1 | 8/2010 | Tse | |

OTHER PUBLICATIONS

"Li-Ion, NiMH Battery Measuring, Charge Balancing and Power-Supply Circuit", Atmel ATA6870, Mar. 2011, 55 pages.
"Active Cell Balancing Methods for Li-Ion Battery Management ICs Using the ATA6870", Atmel Corporation, Application Note, Apr. 2010, 9 pages.

(Continued)

*Primary Examiner* — Hal Kaplan
(74) *Attorney, Agent, or Firm* — Brake Hughes Bellermann LLP (57) ABSTRACT

An apparatus includes a first cell subpack having a plurality of cells arranged in series and a second cell subpack connected in series to the first cell subpack. The second cell subpack includes a plurality of cells arranged in series and at least one cell arranged in parallel with one of the plurality of cells, arranged in series, of the second cell subpack, where the first cell subpack and the second cell subpack use a first voltage rail to provide at least a first voltage level and a second voltage rail to provide a second voltage level, where the first voltage level is different from the second voltage level.

19 Claims, 9 Drawing Sheets

(56) References Cited

OTHER PUBLICATIONS

Barsukov, et al, "Battery Cell Balancing: What to Balance and How", Texas Instruments, 2005, 8 pages.
Buckley, "Battery Management Circuit Features Active Cell Balancing for High-Cell-Count Li-Ion Batteries", EE Times Europe, Mar. 4, 2010, 2 pages.
Ci, et al, "A Novel Design of Adaptive Reconfigurable Multicell Battery for Power-Aware Embedded Networked Sensing Systems", IEEE GLOBECOM 2007 Proceedings, 5 pages.
Cleveland, "Bi-Directional, Portable Power-Management System for Multi-Cell, Li-Ion Battery-Pack Applications", Battery Power Products & Technology, vol. 11, Issue 2, Mar./Apr. 2007, 4 pages.
"Designing Multi-Cell Li-Ion Battery Packs Using the ISL9208 Analog Front End", Intersil, Application Note AN1333.0, Jul. 17, 2007, 25 pages.
"Multi-Cell Li-Ion Battery Pack Analog Front-End", Intersil, Data Sheet FN6719.0, Jul. 3, 2008, 19 pages.
"Multi-Cell Li-Ion Battery Pack OCP/Analog Front-End", Intersil, Data Sheet FN6718.0, Jul. 3, 2008, 28 pages.
Martinez, "Cell Balancing Maximizes the Capacity of Multi-Cell Li-Ion Battery Packs", Intersil Corporation, 2005, 5 pages.
Martinez, et al, "Using Cell Balancing to Maximize the Capacity of Multi-Cell Li-Ion Battery Packs", Intersil, Application Note, AN167.0, Jun. 7, 2005, 8 pages.
"Voltage Protection with Automatic Cell Balance for 2-Series Cell Li-Ion Batteries", Texas Instruments, SLUSA52A, Sep. 2010, 17 pages.
Torres, "Multi-Cell Li-Ion Battery Management System Using MSP430F5529 and bq76PL536", Texas Instruments, Application Report SLAA478, Dec. 2010, 13 pages.
Wen, "Cell Balancing Buys Extra Run Time and Battery Life", Texas Instruments Incorporated, 2009, 8 pages.

\* cited by examiner

BATTERY PACK

CROSS REFERENCE TO RELATED APPLICATIONS

This application claims the benefit of U.S. Provisional Application No. 61/436,555, filed Jan. 26, 2011, entitled "Battery Pack," which is hereby incorporated by reference in its entirety.

TECHNICAL FIELD

This description relates to a battery pack for a device.

BACKGROUND

A battery pack may be used to provide power to a mobile device and its various different components or loads. The various different components or loads in a mobile device may have different voltage and/or power requirements. It may be desirable to provide a battery pack having an architecture to meet the different voltage and/or power requirements.

SUMMARY

According to one general aspect, an apparatus includes a first cell subpack having a plurality of cells arranged in series and a second cell subpack connected in series to the first cell subpack. The second cell subpack includes a plurality of cells arranged in series and at least one cell arranged in parallel with one of the plurality of cells, arranged in series, of the second cell subpack, where the first cell subpack and the second cell subpack use a first voltage rail to provide at least a first voltage level and a second voltage rail to provide a second voltage level, where the first voltage level is different from the second voltage level.

Implementations may include one or more of the following features. For example, the second cell subpack may include multiple cells arranged in parallel with one of the plurality of cells, arranged in series, of the second cell subpack and the cells arranged in parallel match each other in battery chemistry and differ from each other in cell capacity. The first voltage level may be matched to an expected first load voltage level and the second voltage level may be matched to an expected second load voltage level.

In one exemplary implementation, the apparatus may further include a first voltage regulator connected to the first cell subpack and the second cell subpack to regulate the first voltage level to match an expected first load voltage level and a second voltage regulator connected to the first cell subpack and the second cell subpack to regulate the second voltage level to match an expected second load voltage level. The first voltage regulator may include a boost voltage regulator to regulate the first voltage level to match an expected backlight unit voltage level and the second voltage regulator may include a buck voltage regulator to regulate the second voltage level to match an expected universal serial bus (USB) voltage level.

In one exemplary implementation, the apparatus may further include a balancer connected to the first cell subpack and the second cell subpack, where the balancer is configured to shuttle charge from the first cell subpack to the second cell subpack.

The first cell subpack may provide the first voltage level and the second cell subpack may provide the second voltage level independent of the first cell subpack. The first cell subpack may be configured operate in an operating mode and, at a same time, the second cell subpack may be configured to operate in charging mode. A cell within the first cell subpack may charge one or more other cells within the first cell subpack. A cell within the first cell subpack may charge one or more other cells within the second cell subpack.

In one exemplary implementation, the apparatus may further include a third cell subpack having a plurality of cells arranged in series and at least one cell arranged in parallel with one of the plurality of cells, arranged in series, of the third subpack. The third cell subpack may be connected in series to the first cell subpack and the second cell subpack and may be configured to provide at least a third voltage level, where the third voltage level is different from the first voltage level and the second voltage level. The apparatus may further include a first balancer connected to the first cell subpack to transfer charge among the cells within the first cell subpack, a second balancer connected to the second cell subpack to transfer charge among the cells within the second cell subpack and a third balancer connected to the third cell subpack to transfer charge among the cells within the third cell subpack. The apparatus may further include a fourth balancer connected to the first cell subpack, the second cell subpack and the third cell subpack. The fourth balancer may be configured to transfer charge between the first cell subpack, the second cell subpack and the third cell subpack.

In another general aspect, an apparatus includes multiple cells arranged in series, where the multiple cells are configured to provide a first voltage level to a first load through a first voltage rail, a voltage regulator connected to the first voltage rail, where the voltage regulator is charged by the multiple cells in series and at least one lithium ion cell connected to an output of the voltage regulator. The lithium ion cell has a battery chemistry different from the multiple cells arranged in series, where the voltage regulator is configured to charge the lithium ion cell.

Implementations may include one or more of the following features. For example, the lithium ion cell may be a lithium iron phosphate cell. The voltage regulator may be configured to charge the lithium ion cell only on demand at peak efficiency. The lithium ion cell may be configured to provide a second voltage level to at least a second load through a second voltage rail.

In another general aspect, an apparatus includes a first cell subpack having multiple matched cells in series to provide a first voltage level and a second cell subpack connected in series to the second cell subpack. The second cell subpack includes multiple unmatched cells in parallel to provide a second voltage level, where the first voltage level is different from the second voltage level and the unmatched cells in parallel have a same cell chemistry.

Implementations may include one or more of the following features. For example, charge may be transferred between the first cell subpack and the second cell subpack to recharge the second cell subpack from the first cell subpack. The first cell subpack may operate independent from the second cell subpack.

The details of one or more implementations are set forth in the accompanying drawings and the description below. Other features will be apparent from the description and drawings, and from the claims.

DETAILED DESCRIPTION

In one general aspect, a battery pack architecture may include various combinations of series and parallel battery cells (also simply referred to as "cells"). The battery pack may include multiple taps or multiple voltage rails that are arranged to provide different voltages to various loads having different voltage and power requirements. In this manner, the arrangement of the cells and the voltage rails coming off of the cell terminals in the battery pack may be configured based on an expected use of the rails to most efficiently meet the voltage requirements of different loads (e.g., different loads in an electronic device). The number of cells used in the battery pack and the configuration of the cells and rails may be selected and arranged based on an expected average use of the voltages by various different loads. In this manner, the battery pack may be isolated into various sub-sections, where each of the sub-sections may provide different voltages for different loads.

The battery pack may be configured to provide multiple different voltage levels, at the same time, to different portions of an electronic device such as, for example, a tablet computing device, a laptop, a smart phone, or any mobile computing device. For example, one sub-section of the battery pack, including a certain configuration of cells from the pack, may provide one voltage level to power a backlight unit ("BLU") and another sub-section of the battery pack, including a certain configuration of cells from the pack, may provide a different voltage level to power a universal serial bus ("USB"). Still other sub-sections may provide different voltage levels to other components.

In one aspect, the battery pack may include an arrangement of cells in series, where one or more of the cells in series may be arranged in parallel with other cells. In this manner, the cells arranged in parallel only need to match the battery chemistry of each other and do not need to match other aspects.

In one aspect, the cells and rails in the battery pack may be arranged and configured based on the average expected use such that charge balancing among the cells or the sub-sections would not be needed. In this situation, all of the cells or sub-sections in the battery pack would charge and discharge at the same rate such that charge balancing or cell balancing would not be needed.

In another aspect, where the cells in the battery pack may discharge and charge at variable rates, then various cell balancing techniques may be used to shuttle charge from one or more cells to other cells. For example, in a battery pack where one configuration of cells provides a higher voltage level to power a BLU, where the BLU was not draining much power, those cells having a higher state-of-charge (SOC) could be used to charge other cells or groups of cells having a lower SOC in order to achieve cell balancing.

In the exemplary battery packs illustrated below, the voltage regulators and/or the cell balancing circuits may or may not be a part of the battery packs. The battery packs may include the arrangement of cells and the voltage rails or taps that may be used to connect directly to loads or to voltage regulators and/or cell balancing circuits. In some implementations, those elements may be a part of the battery packs.

Various different cell balancing arrangements may be used in the examples discussed below with respect to the figures. Although a particular type of cell balancing arrangement may be illustrated, it is understood that other cell balancing schemes may be used such as, for example, any-to-any isolated balancing, capacitor shuttle, single cell shuttle, etc.

Figure 1:
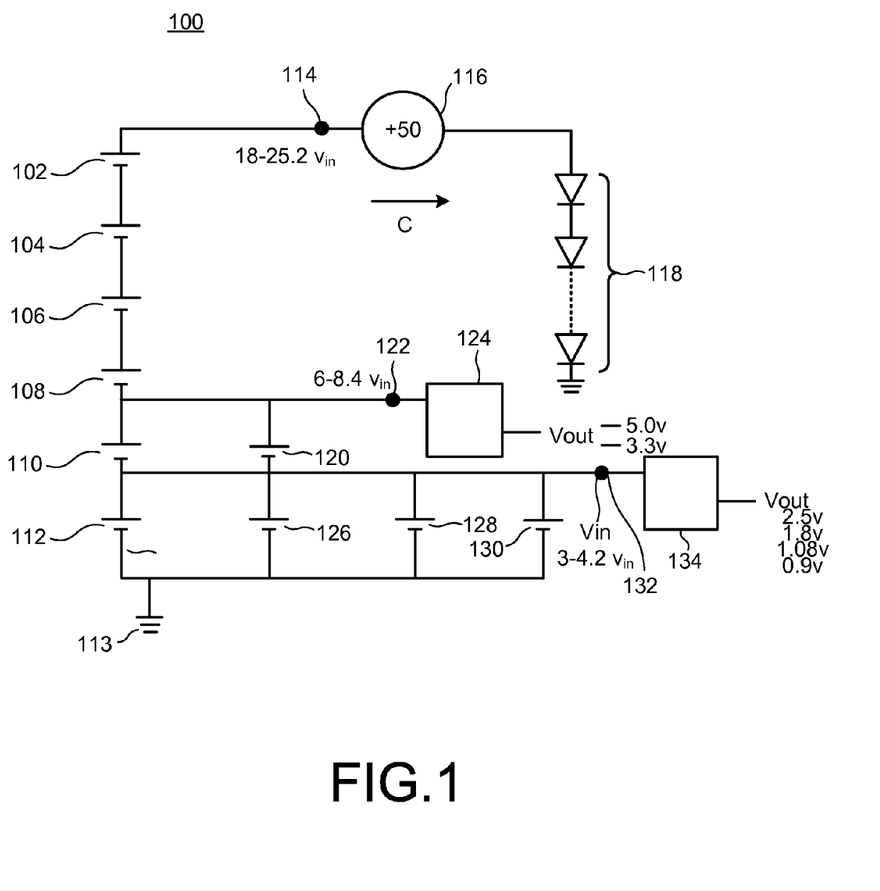
FIG. 1 is a schematic diagram of an exemplary battery pack.

Referring to FIG. 1, a schematic diagram illustrates an exemplary battery pack 100 having ten (10) battery rechargeable cells 102, 104, 106, 108, 110, 112, 120, 126, 128 and 130. For example, the cells may include lithium ion (Li-ion), nickel cadmium (NiCd), or nickel metal hydride (NiMH) compositions with all 10 cells being of the same battery chemistry. The Li-ion cells may include an anode material such as graphite and the cathode may be one of a layered oxide (e.g., lithium cobalt oxide), a polyanion (e.g., lithium iron phosphate) or a spinel (e.g., lithium manganese oxide).

The example of FIG. 1 illustrates rechargeable cells having a Li-ion composition with each cell having a voltage range of about 3.0V fully discharged to 4.2V fully charged.

Cells 102, 104, 106, 108, 110 and 112 may be arranged in series with cell 112 connected to ground 113. The cells 102-112 may provide a voltage input in the range of about 18V to 25.2V through a voltage rail or tap 114 to a voltage regulator such as, for example, boost voltage regulator 116. The boost voltage regulator 116 may boost the voltage input to a higher voltage such as, for example, to 50V. The output of the boost voltage regulator 116 may be configured to supply voltage to a component of a device such as, for example, a backlight unit (BLU), which may include multiple light emitting diodes (LEDs) 118 arranged in a desired configuration.

In the example of FIG. 1, the six (6) cells 102-112 arranged in series may use approximately 60% of the overall battery pack 100 capacity. In this manner, approximately 60% of the overall battery pack 100 capacity may be used to provide power to the BLU. While not illustrated, it is understood that battery pack 100 may include additional cells arranged in series with the cells 102-112.

Cells 120 and 126 may provide an approximate voltage input of about 6V to 8.4V through a voltage rail or tap 122 to a voltage regulator such as, for example, buck voltage regulator 124. The buck voltage regulator 124 may be configured to regulate the input voltage to a lower voltage output such as, for example, a 5V and/or a 3.3V voltage output. The output of the buck voltage regulator 124 may be configured to supply voltage to one or more components of a device such as, for example, a universal serial bus (USB) port. The USB port may be used, for example, to power and/or recharge devices plugged into the port.

Also, for the cells 110 and 120 arranged in parallel, the cells need not match each other with respect to shape, size, capacity, etc. It may only be necessary that the cells 110 and 120 match each other with respect to battery chemistry. Furthermore, it is understood that other cells may be added in parallel with these cells. While not illustrated, it is understood that the battery pack 100 may include additional cells arranged in parallel with the cells 110 and 120.

In the example of FIG. 1, the two (2) cells 120 and 126 may use approximately 20% of the overall battery pack 100 capacity. In this manner, approximately 20% of the overall battery pack 100 capacity may be used to provide power to the +5V and +3.3V regulators.

Cells 128 and 130 may provide an approximate voltage input of about 3.0V to 4.2V through a voltage rail or tap 132 to a voltage regulator such as, for example, buck voltage regulator 134. The buck voltage regulator 134 may be configured to regulate the voltage input to a lower voltage output range such as, for example, a range of 0.9V to 2.5V. The output of the buck voltage regulator 134 may be configured to supply voltage to one or more components of a device.

In the example of FIG. 1, the two cells 128 and 130 may use approximately 20% of the overall battery pack 100 capacity. In this manner, approximately 20% of the overall battery pack 100 capacity may be used to provide a voltage input to the buck voltage regulator 134 through the voltage rail 132.

Also, for the cells 112, 126, 128 and 130 arranged in parallel, the cells need not match each other with respect to shape, size, capacity, etc. It may only be necessary that the cells 112, 126, 128 and 130 match each other with respect to battery chemistry. Furthermore, it is understood that other cells may be added in parallel with these cells.

The voltage regulators 116, 124 and 134 may or may not be included as part of the battery pack 100. Instead, the voltage regulators 116, 124 and 134 may be components that are operably coupled to the battery pack 100 through one or more terminals.

In an ideal situation, where the cells of the battery pack 100 all discharge and charge together, it would not be necessary to perform any cell or charge balancing. In this manner, the cells would operate in lockstep. In this example, the cell count of ten (10) total cells arranged in the illustrated series-parallel combination may be based on an average expected use of a device in which the battery pack may be used, including providing various different voltage levels through the voltage rails 114, 122 and 132.

If the actual load ratio deviates from the ideal load ratio, then charge balancing circuitry may be used to restore a balanced state of charge (SOC) to all of the cells. Different types of charge balancing circuitry may be used including, for example, using current bypass techniques, charge redistribution techniques, any-to-any isolated balancing, capacitor shuttle, single cell shuttle, etc.

In one exemplary implementation, any of the three voltage rails 114, 122 and 132 may be used to fully charge the battery pack 100. For example, a charger (e.g., wall charger), which is not illustrated in FIG. 1, may be used to charge the battery pack 100 to a certain % of capacity via a float voltage applied to the rail 114. The remaining percentage of the capacity may be provided using a charge balancing circuit (not shown) to distribute charge from the cell 102 and/or cells 104, 106 and 108 to the cells arranged in parallel, that is cells 110 and 120 and cells 112, 126, 128 and 130.

Alternatively, for example, a 5V USB host supply may use the voltage rail 132 to charge the battery pack 100 to a certain % of capacity via a float voltage applied to the rail 132. The remaining cells can be brought to full capacity by the charge balancing circuit.

The battery pack 100 may be configured to operate in several different modes, some or all of which may be in operation simultaneously. The operating modes may include operating, charging and balancing. In one implementation, the cells may be grouped into sub-sections and independently power their respective loads. For example, in the operating mode, the cells 102-112 arranged in series may independently power the boost voltage regulator 116, the cells 120 and 126 may independently power the buck voltage regulator 124 and the cells 128 and 130 may independently power the buck voltage regulator 134.

In the charging mode, the sub-sections of cells may be independently charged using the respective voltage rails 114, 122 and 132. In the balancing mode, each of the sub-sections may include its own respective balancing circuit, which may be coupled or connected to the other sub-sections to enable cell balancing among the sub-sections. Different cell balancing schemes may be used.

In this manner, while one sub-section is in one mode, the other sub-sections may be in different modes. For instance, one sub-section may be in an operating mode, another sub-section may be in a charging mode and another sub-section may be in a cell-balancing mode. Various combinations of the different modes and different sub-sections may be realized. Each of the sub-sections of various cell arrangements may be isolated from one another within the same battery pack 100. The isolated sub-sections may be interconnected to enable the operation of the various modes.

While in many cases, all of the cells in sub-sections may be of the identical type, this may not be necessary. Typically, all of the cells in a series sub-system (also may be referred to as a "sub-pack") may be matched. But the cells in the parallel sub-pack can have a different type and capacity. In fact, while the cells in a parallel sub-pack must have identical battery chemistry, the cells in the parallel sub-pack may include a variety of different cell constructions and capacities. This capability may allow unique design approaches that are not possible with conventional battery pack construction.

In one exemplary implementation, a "lazy charging" scheme may be used. For example, a single, low-capacity "partner" cell within an intermediate (40-60% TYP) SOC range may be used. The partner cell may draw charge from a cell having the highest voltage. The partner cell may draw charge until either the highest voltage cell is adequately close to that of the other cells or to the partner cell rises to a certain SOC such as, for example, 60% SOC. Then, the partner cell may dump charge into the series cell with the lowest voltage until either its voltage is adequately close to that of the other cells or the partner cell falls to a certain SOC.

In another exemplary implementation, the partner cell may be arranged to provide the source for a system supply voltage rail (e.g., RTC, DRAM refresh, sleep current, etc.). In another exemplary implementation, a partner cell may not be included and current withdrawn from series cells by a balancing circuit is directly utilized by some system supply rail. In another exemplary implementation, cell balancing may be achieved by supplying charge from a low-grade source such as, for example, a solar cell, to the weakest cell in a series chain of cells.

While FIG. 1 illustrates a battery pack 100 having 10 cells arranged in an unbalanced series-parallel combination having multiple taps to provide output voltages to different loads, it is understood that other numbers of cells and combinations of cells may be used to provide multiple different voltages using different taps or voltage rails to provide output voltages to different loads of a device or devices.

Figure 2:
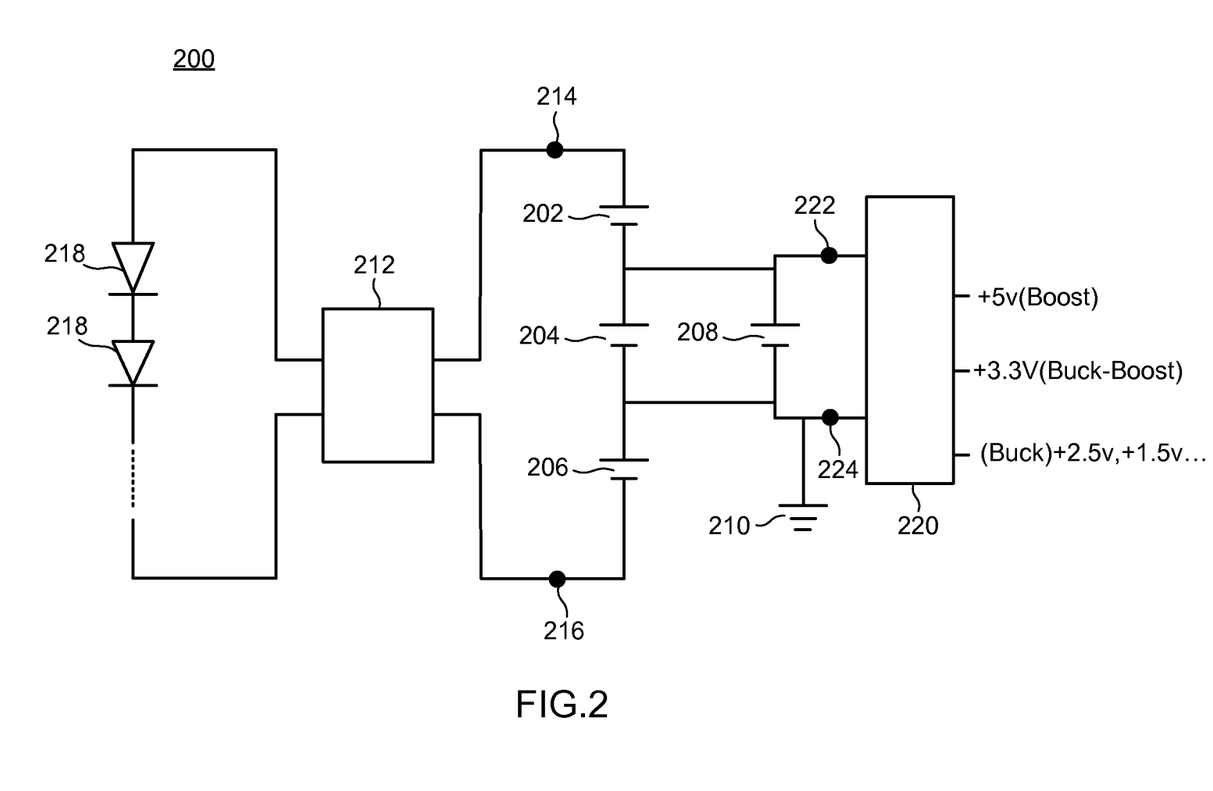
FIG. 2 is a schematic diagram of an exemplary battery pack.

Referring to FIG. 2, a schematic diagram illustrates an exemplary battery pack 200. Battery pack 200 may include four (4) cells 202, 204, 206 and 208. Cells 202, 204 and 206 may be arranged in series and cells 204 and 208 may be arranged in parallel with respect to ground 210.

In the example of FIG. 2, the cells 202, 204 and 206 arranged in series may provide a voltage input to a backlight unit (BLU) 212 through voltage rails (or taps) 214 and 216. The BLU 212 may be a voltage regulator which receives the voltage input and provides the desired voltage output to power multiple light emitting diodes (LEDs) 218 in a device in which the battery pack 200 is being used. BLU 212 also may be referred to as a LED boost controller.

The location of the ground 210 allows a conventional single-cell negative ground architecture for the standard +5V, +3.3V, etc. rails, while allowing only one hop from either the top cell 202 or the bottom cell 206 to the center cells. The location of the ground 210 also allows a higher voltage and supplies (e.g., +40V and −40V) to the LED BLU supply, without exceeding regulatory limits of about 50V to ground.

The cells 204 and 208 may be configured in parallel and may provide a voltage input to supply voltage to any remaining loads of the device in which the battery pack 200 is being used. For example, the cells 204 and 208 may provide a voltage input to a voltage regulator 220 through voltage rails 222 and 224. The voltage regulator 220 may be a combination of voltage regulators (boost, buck, buck/boost) to provide the desired voltage output to power loads having different voltage requirements.

The battery pack 200 of FIG. 2 may exhibit that same or similar characteristics as battery pack 100 of FIG. 1, as described above. Additionally, for cell charging or cell balancing purposes, cells 202 and 206, either alone or in combination, may be used balance the cells 204 and 208. For example, cells 202 and 206, either alone or in combination, may be used to shuttle charge to cells 204 and 208. In this example, 75% of cell capacity may be used for the BLU 212 and the remaining 25% of capacity may be used for the other loads, without the need for balancing circuits.

Figure 3:
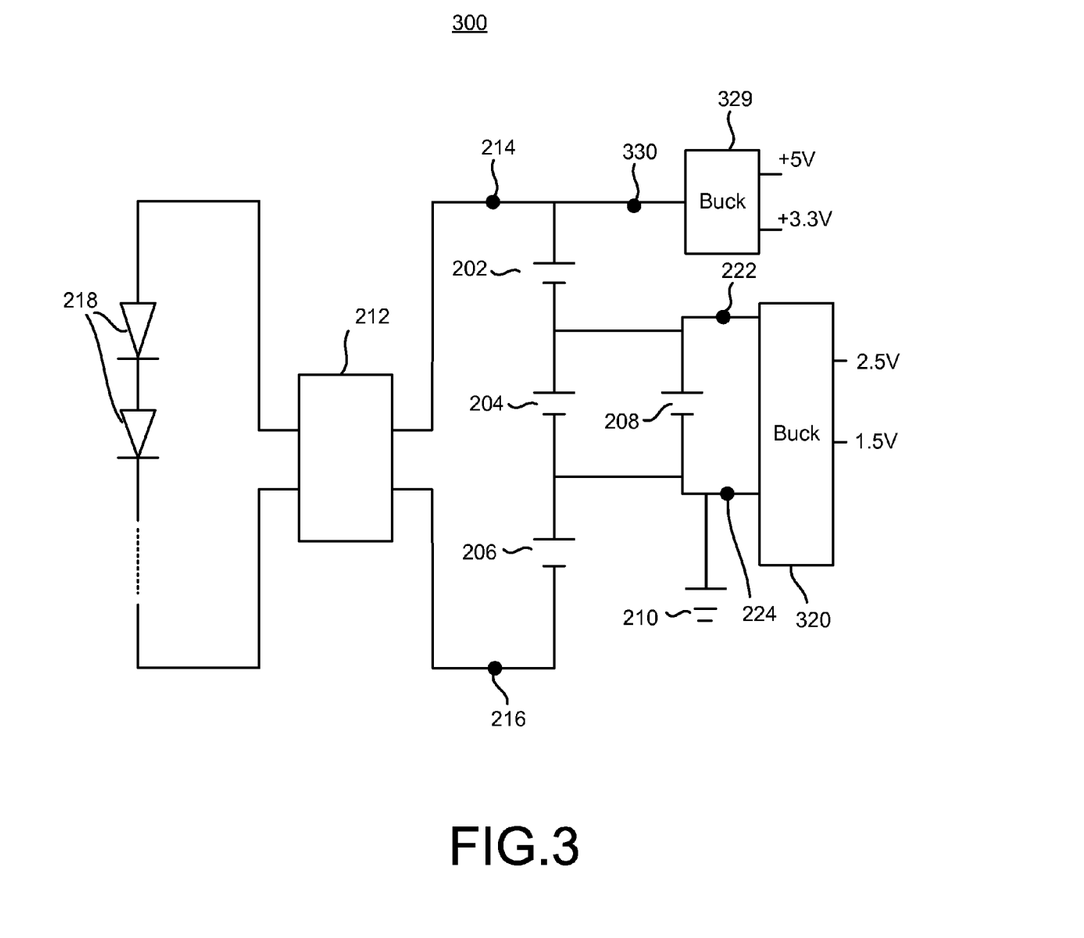
FIG. 3 is a schematic diagram of an exemplary battery pack.

Referring to FIG. 3, a schematic diagram illustrates an exemplary battery pack 300. Battery pack 300 may include the same cell arrangement as battery pack 200 of FIG. 2. Thus, battery pack 300 may include four (4) cells 202, 204, 206 and 208. Cells 202, 204 and 206 may be arranged in series and cells 204 and 208 may be arranged in parallel with respect to ground 210.

In the example of FIG. 3, a separate voltage regulator 329 may be connected to the circuit through rail 330 to use the voltage input of the cell 202 to power loads in a device in which the battery pack 300 is being used. For example, the voltage regulator 329 may provide voltage outputs of 5V and 3.3V.

A voltage regulator 320 may be a buck voltage regulator and may use the voltage input from cells 204 and 208 to provide a voltage output to power loads in the device in which the battery pack 300 is being used. In this exemplary implementation, some charge balancing schemes may need to use multiple hops when transferring charge from cell 206 to cell 202.

Figure 4:
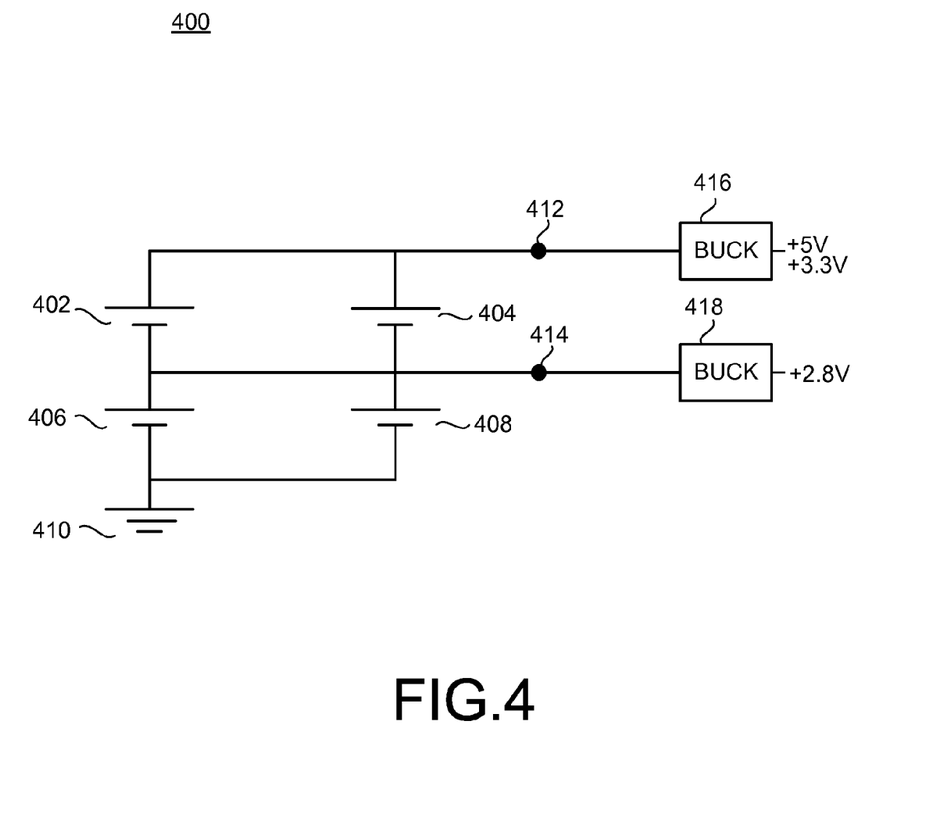
FIG. 4 is a schematic diagram of an exemplary battery pack.

Referring to FIG. 4, a schematic diagram illustrates an exemplary battery pack 400. Battery pack 400 may include four (4) cells 402, 404, 406 and 408 with respect to ground 410. Cells 402 and 404 may be in parallel and cells 406 and 408 may be in parallel. Cells 402 and 404 may be considered one sub-pack that is arranged in series with another sub-pack of cells 406 and 408. Voltage rails or taps 412 and 414 may provide points for connecting the battery pack to output various different voltages to supply voltages to loads connected to the battery pack using, for example, buck voltage regulators 416 and 418.

Figure 5:
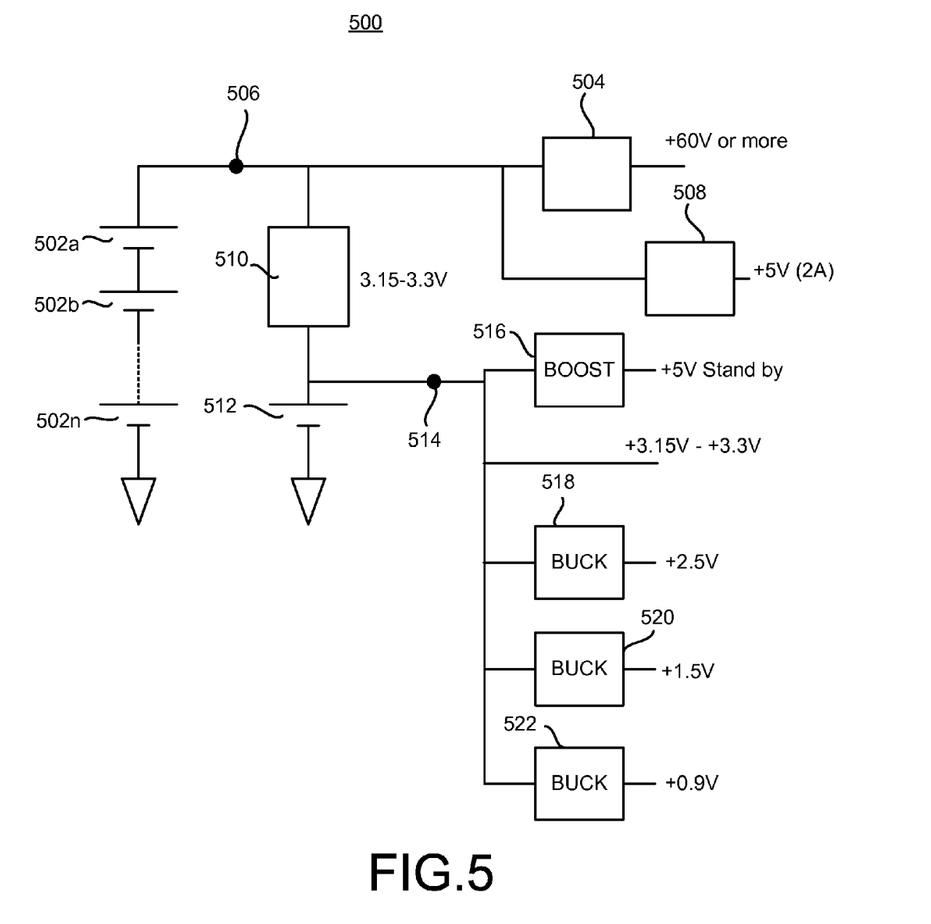
FIG. 5 is a schematic diagram of an exemplary battery pack.

Referring to FIG. 5, a schematic diagram illustrates an exemplary battery pack 500. Battery pack 500 may include multiple cells 502a, 502b through 502n arranged in series. In one exemplary implementation, the cells 502a-502n may include from three (3) cells to nine (9) cells arranged in series. In other exemplary implementations, other numbers of cells may be arranged in series. In one exemplary implementation, the cells 502a-502n all may include the same battery chemistry such as, for example, including lithium cobalt oxide constructed cells.

The cells 502a-502n may provide a voltage input to a voltage regulator 504 via a voltage rail (or tap) 506. In one exemplary implementation, the voltage regulator 504 may include a boost voltage regulator and boost the voltage input to the voltage regulator 504 to a voltage output of approximately 60V. In other exemplary implementations, the voltage regulator may boost the voltage input to other voltage levels, including voltage levels greater than 60V. The voltage output may provide a voltage to a load in a device such as, for example, a BLU.

The cells 502a-502n also may provide a voltage input to a voltage regulator 508 via the voltage rail 506. In one exemplary implementation, the voltage regulator 508 may include a buck voltage regulator and provide a voltage output of approximately 5V at 2 A. The voltage output may provide a voltage to a load in a device such as a USB port, which may supply power to or recharge devices connected to the USB port.

The cells 502a-502n also may provide a voltage input to a voltage regulator 510 via the voltage rail 506. The voltage regulator 510 may regulate the input voltage to an output voltage range of about 3.15V to 3.3V. In one exemplary implementation, the voltage regulator 510 may be configured as a charger to charge cell 512. The voltage regulator 510 may be referred to as a smart charger or a peak efficiency charger since it may be configured to only run at over the narrow range of conditions where it is most efficient. In one exemplary implementation, the output voltage range may be 3.0V to 3.6V to allow for a +/−10% tolerance. A narrower range may be selected based on the requirements of a particular system. For example, the charging may be started at 3.15V and stopped at 3.3V.

The cell 512 may be a Li-ion cell having a different battery chemistry than cells 502a-502n. For example, cell 512 may be constructed using lithium iron phosphate (e.g., $LiFePO_4$). A lithium iron phosphate constructed cell may be desirable due to its inherent properties of a low impedance and low voltage in the range of about 3.0V to 3.6V. The voltage input from the cells 502a-502n may charge the voltage regulator 510, which may run only on demand at peak efficiency to charge cell 512 when needed. In this manner, the voltage regulator 510 may automatically switch on and switch off as needed to charge cell 512. The voltage regulator 510 may periodically charge the cell 512 only when the regulator can be run at peak efficiency.

The cell 512 may be used to provide voltage inputs to voltage regulators 516, 518, 520 and 522 via voltage rail 514. The cell 512 also may be used to provide a direct 3.15V-3.3V output without using a voltage regulator to provide voltage to any load requiring 3.3V. The voltage regulators 516, 518, 520 and 522 may include buck, boost or buck/boost voltage regulators to provide the desired voltage outputs as indicated in FIG. 5. The voltage output from the voltage regulators 516, 518, 520 and 522 may provide voltage to any load requiring the indicated voltage. In this manner, the single cell 512 may be used to supply all of the lower supply voltage loads connected to the battery pack 500. The voltage from the cell 512 can directly supply the 3.15V-3.3V and can also be regulated down using the voltage regulators 516, 518, 520 and 522 to supply other low voltage loads.

In one exemplary implementation, an "emergency catch" regulator may be included and may be set at about 3.05V to assure that the system survives a voltage spike. It may be a linear regulator or an on-off FET that ensures that the rail does not dip below 3.0V.

For maximum capacity (mAh or Wh), a LiFePO4 cell (e.g., cell 512) is typically be charged to ~3.6V, which also happens to be the upper limit for a 3.3V +/−10% power supply. When the battery pack 500 is charged from the AC mains, the cell 512 will be fully charged to ~3.6V. When placed in service, the cell 512 will initially be allowed to discharge as it supplies power to its circuits. When the cell 512 reaches some lower voltage such as, for example 3.25V, it will be charged from other cells in the system at a rate that optimizes overall power system efficiency. Under light load, this overall charge rate will be determined by minimizing the product of the charger conversion efficiency and the cell charging efficiency. Under heavy load, a higher charge current will be required to avoid cell depletion. Charging will cease when the cell 512 reaches some higher voltage such as, for example 3.35V. The process will repeat cyclically until all cells in the system have fully discharged. Note that dynamic power in a CMOS circuit is proportional to $V^2$, so there is a significant benefit to reducing the cell float voltage as low as possible, limited only by the 3.0V MIN limit, the cell impedance and the anticipated maximum load. For example, if the cell impedance is 0.050 ohms, and the maximum load is 2 A, in the limit, the float voltage could be set as low as 3.0+0.05*2=3.1V.

While not illustrated in FIG. 5, one or more cell balancers, including cell balancing circuitry, may be connected to cells 502a-502n to shuttle charge between the cells in an efficient manner.

Figure 6:
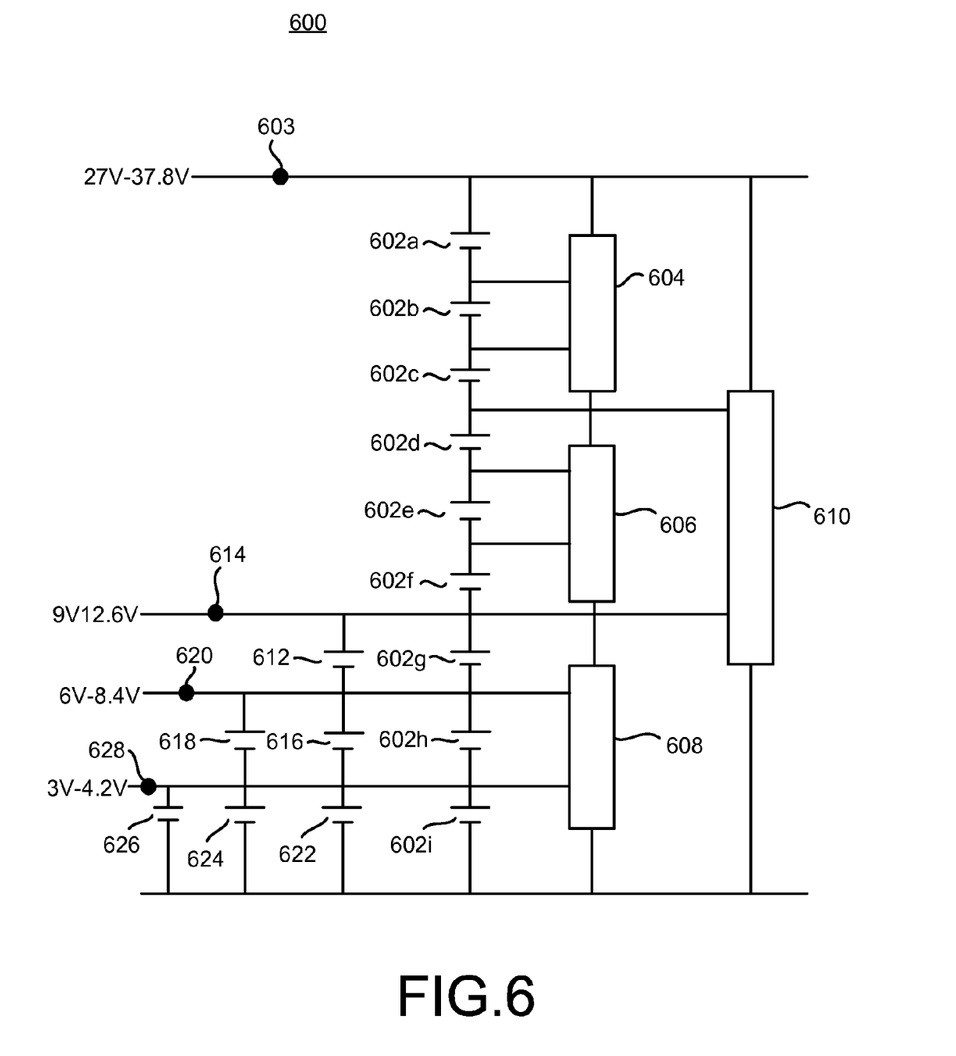
FIG. 6 is a schematic diagram of an exemplary battery pack.

Referring to FIG. 6, a schematic diagram illustrates an exemplary battery pack 600. The battery pack 600 may include multiple cells arranged in series, with some of the cells in series also arranged in parallel with other cells. In one exemplary implementation, the battery pack 600 includes 15 cells. The battery pack 600 includes nine (9) cells 602a-602i connected in series and configured to provide a voltage range of about 27V to 37.8V, depending on the SOC of each cell being between 3.0V and 4.2V. The cells 602a-602i may provide the voltage directly to a load or may provide the voltage as an input to a voltage regulator (not shown) via a voltage rail (or tap) 603.

The cells 602a-602i may be grouped in three groups of three cells each, where each group of 3 may be connected to a respective cell balancing circuit (also referred to as a balancer) 604, 606 or 608. The first group of cells 602a-602c may be connected to balancer 604. The balancer 604 may be configured to use any one of a number of cell balancing techniques to transfer charge among the cells 602a-602c. The balancer 604 may be used to account for and rectify minor differentials in the state of charge between the cells in the first group due to, for instance, differential aging of the cells or differences in manufacturing. For example, the balancer 604 may efficiently transfer charge between 602a and 602b and between 602b and 602c.

The second group of cells 602d-602f may be connected to balancer 606. The balancer 606 may be configured to use any one of a number of cell balancing techniques to transfer charge among the cells 602d-602f. The balancer 606 may be used to account for and rectify minor differentials in the state of charge between the cells in the first group. For example, the balancer 606 may efficiently transfer charge between 602d and 602e and between 602e and 602f.

The third group of cells 602g-602i may be connected to balancer 608. The balancer 608 may be configured to use any one of a number of cell balancing techniques to transfer charge among the cells 602g-602i. The balancer 608 may be used to account for and rectify minor differentials in the state of charge between the cells in the first group. For example, the balancer 608 may efficiently transfer charge between 602g and 602h and between 602h and 602i.

The battery pack 600 also may include a balancer 610, which may be configured to transfer charge between the groups of cells. For example, the balancer 610 may be configured to transfer charge efficiently between the first group of cells 602a-602c and the second group of cells 602d-602f and between the second group of cells 602d-602f and the third group of cells 602g-602i. In some exemplary implementations, one or more of the balancers 604, 606 and 608 may be optional. The cell balancers 604, 606, 608 and 610 of FIG. 6 may be used in other battery packs illustrated and described in this document including, for example, battery pack 500 of FIG. 5.

The battery pack 600 also includes cells connected in parallel with some of the cells connected in series. For example, cell 602g may be connected in parallel to a cell 612 and may provide a voltage of approximately 9V to 12.6V via a voltage rail 614. The cells 602g and 612 may provide the voltage directly to a load or may provide the voltage as an input to a voltage regulator (not shown).

Cell 602h may be connected in parallel to a cell 616 and a cell 618 and may provide a voltage of approximately 6V to 8.4V via a voltage rail 620. The cells 602h, 616 and 618 may provide the voltage directly to a load or may provide the voltage as an input to a voltage regulator (not shown).

Cell 602i may be connected in parallel to cells 622, 624 and 626 and may provide a voltage of approximately 3V to 4.2V via a voltage rail 628. The cells 602i, 622, 624 and 626 may provide the voltage directly to a load or may provide the voltage as an input to a voltage regulator (not shown).

In addition to being configured to transfer charge between the cells 602g-602i connected in series, the balancer 608 may be configured to transfer charge between cells, as needed, that are connected in parallel to the cells 602g, 602h and 602i, respectively.

Figure 7:
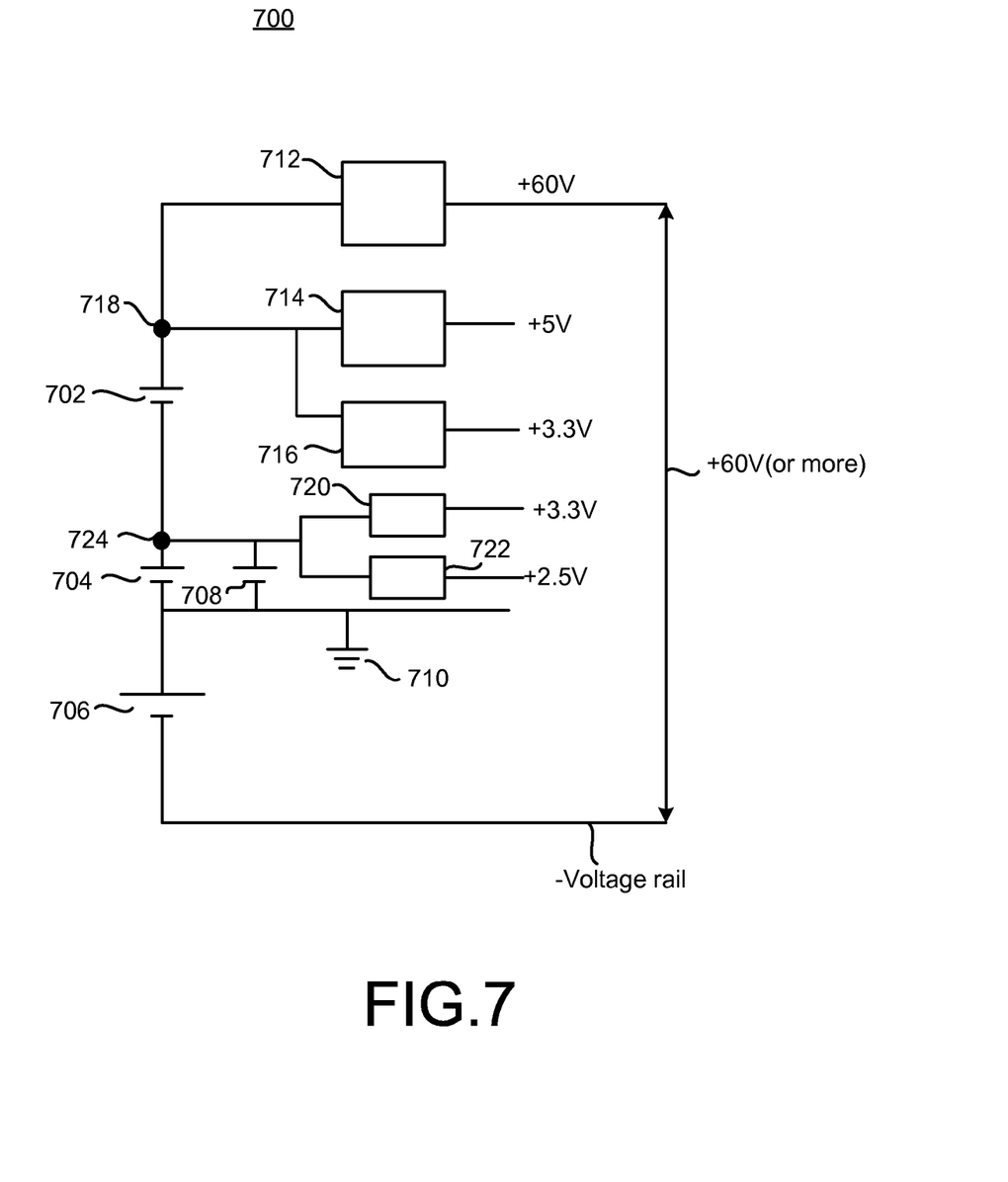
FIG. 7 is a schematic diagram of an exemplary battery pack.

Referring to FIG. 7, a schematic diagram illustrates an exemplary battery pack 700. The battery pack 700 may include three (3) cells 702, 704 and 706 connected in series and one (1) cell 708 connected in parallel to cell 704 with respect to ground 710. Battery pack 700 illustrates an efficiently balanced nominal 11.1V battery pack. While not illustrated, a balancer may be connected to the cells 702, 704 and 706 to efficiently transfer charges between the cells.

The cells 702, 704 and 706 may be configured to provide a voltage input to voltage regulator 712, voltage regulator 714 and voltage regulator 716 via a voltage rail 718. The voltages regulators 712, 714 and 716 may provide voltage outputs to loads of 60V (or more), 5V and 3.3V, respectively.

The cells 704 and 708 connected in parallel may be configured to provide a voltage input to a voltage regulator 720 and voltage regulator 722 via a voltage rail 724. The voltage regulators 720 and 722 may be configured to provide voltage outputs to loads of 3.3V and 2.5V, respectively.

In the battery pack 700, it may be advantageous to run all of the loads off of the cells 704 and 708, except a BLU. Thus, the voltage regulator 714 supplying the 5V may be moved to come off of voltage rail 724 instead of voltage rail 718 and become a boost regulator instead of a buck regulator. In this manner, the top cell 702 and the bottom cell 706 are more likely to remain in balance without having to use a balancer to transfer charge between the top cell 702 and the bottom cell 706.

Also, in this example battery pack 700, the cells are never more than one hop away from transferring charge to another cell. For example, charge may be transferred between the top cell 702 and the two middle cells 704 and 708 in one hop and between the bottom cell 706 and the two middle cells 704 and 708 in one hop, which makes for more efficient charge transfer, assuming charge balancing circuits are included, for example, in a manner similar to FIG. 6.

Figure 8:
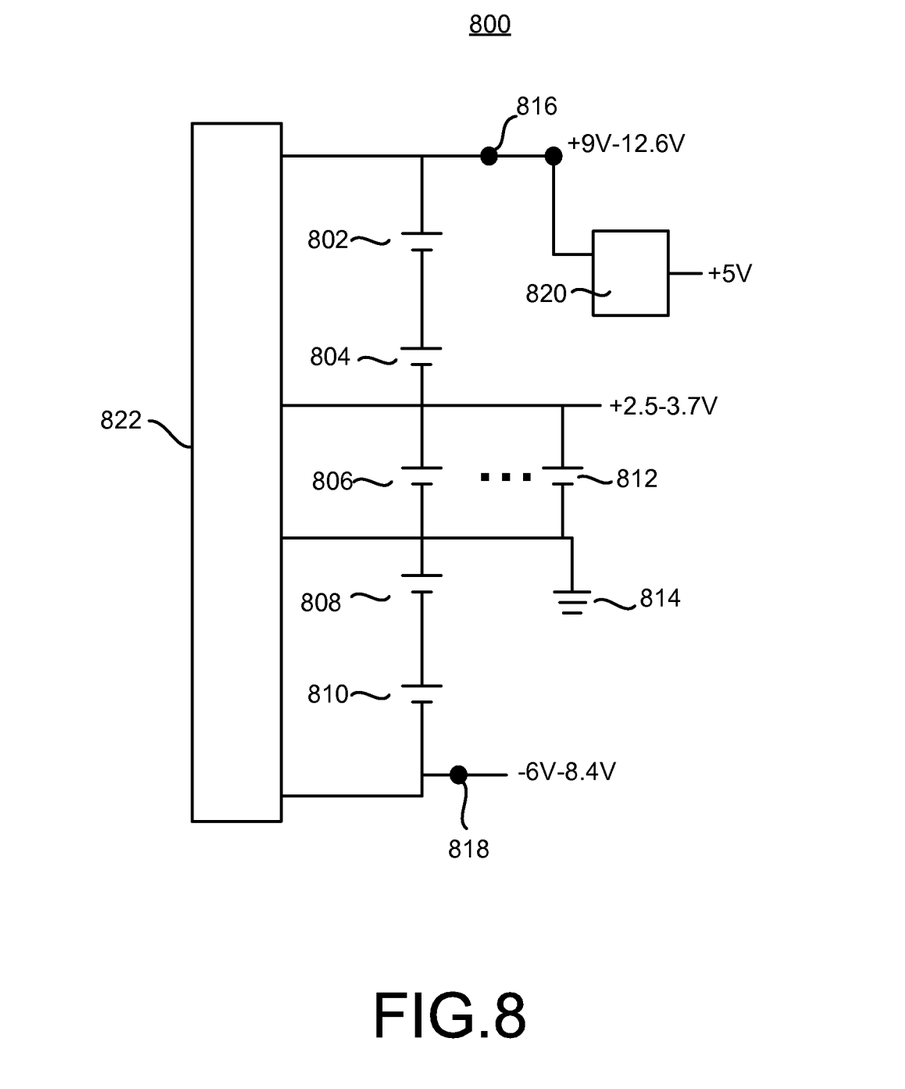
FIG. 8 is a schematic diagram of an exemplary battery pack.

Referring to FIG. 8, a schematic diagram illustrates an exemplary battery pack 800. The battery pack 800 includes five (5) cells 802, 804, 806, 808 and 810 connected in series and one or more cells 812 connected in parallel to the cell 806, all with respect to ground 814. In this arrangement, the cells 802, 804, 806, 808 and 810 connected in series may provide a differential voltage between voltage rails 816 and 818 in the approximate range of about 15V to 21V. This voltage may be used to power a load directly such as, for example, a BLU. These cells connected in series also may provide a voltage input to a voltage regulator 820, which may be a buck voltage regulator to provide a voltage output of 5V.

In one exemplary implementation, the cells 806 and 812 connected in parallel may include cells constructed of lithium iron phosphate, as described above with respect to cell 512 of FIG. 5. The cells 806 and 812 connected in parallel may be configured to provide a voltage output of 2.5V to 3.7V to a load, either directly or through a voltage regulator (not shown). The cells 806 and 812 may be any type of cell and voltage. For example, if lithium iron phosphate cells are used, the voltage range may be 2.5V-3.7V, if there are regulators, or the voltage range may be 3.0V-3.6V if directly supplying a 3.3V rail.

The battery pack 800 also includes a balancer 822. The balancer 822 may be configured to transfer charge between the cells. For example, the cells 802 and 804 may be considered a first group of cells, the cells 806 and 812 may be considered a second group of cells and the cells 808 and 810 may be considered a third group of cells. The balancer 822 may be configured to efficiently transfer charge between the cell groups. For example, the balancer 822 may transfer charge efficiently between the first group and the second group and between the second group and the third group.

In one exemplary implementation, the balancer 822 may include a boost regulator for the situation where charge is transferred from the second group of cells to either the first group of cells or the third group of cells.

In another exemplary implementation, the battery pack 800 may include a sixth cell (not shown) connected in series to the cell 806 as part of the second group of cells. In this implementation, the balancer 822 may not need to include a boost regulator to transfer charge from the second group of cells to either the first group of cells or the third group of cells.

Figure 9:
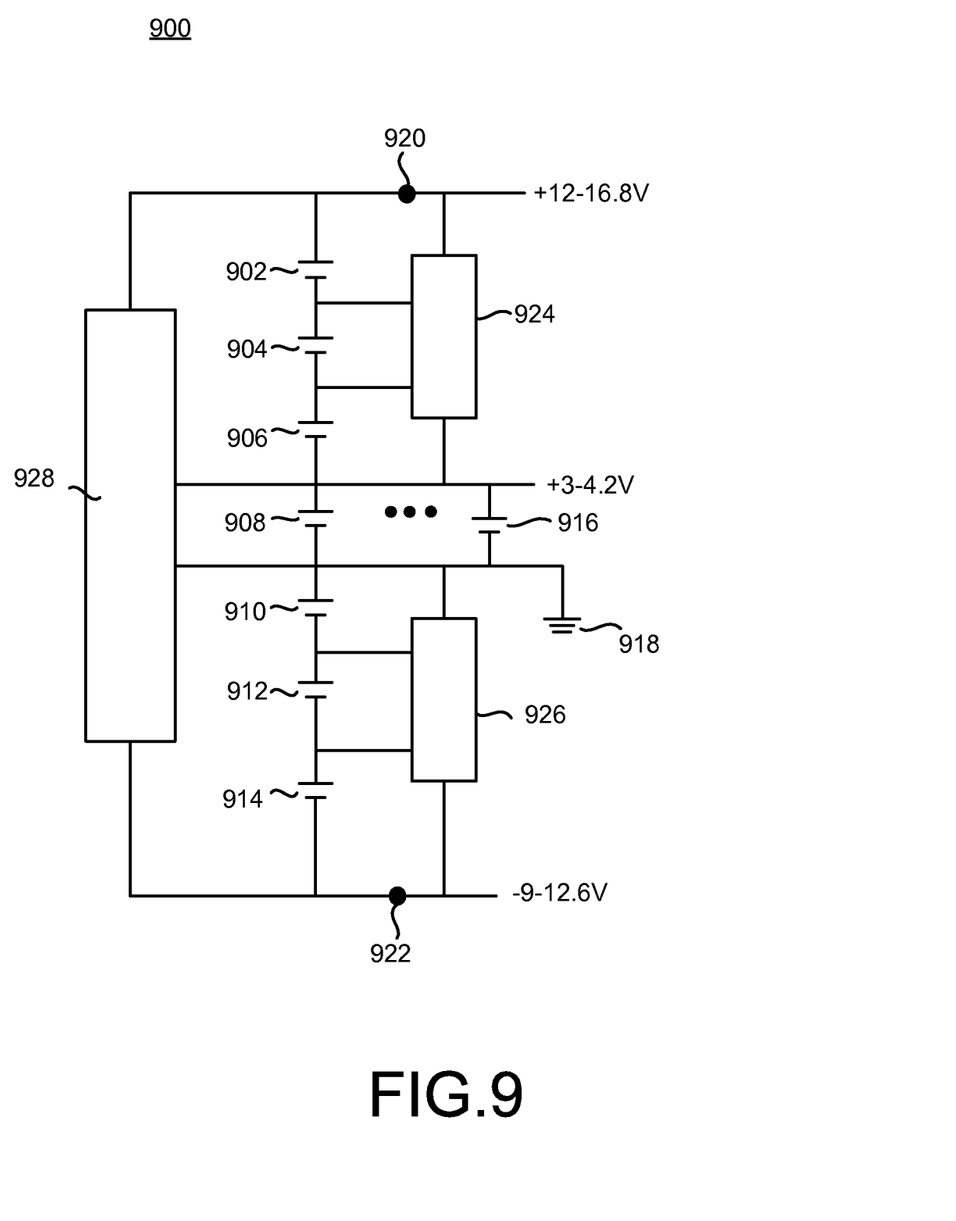
FIG. 9 is a schematic diagram of an exemplary battery pack.

Referring to FIG. 9, a schematic diagram illustrates an exemplary battery pack 900. The battery pack 900 includes seven (7) cells 902, 904, 906, 908, 910, 912 and 914 connected in series and one or more cells 916 connected in parallel to the cell 908, all with respect to ground 918. In this arrangement, the cells 902, 904, 906, 908, 910, 912 and 914 connected in series may provide a differential voltage between voltage rails 920 and 922 in the approximate range of about 21V to 29.4V. This voltage may be used to power a load directly such as, for example, a BLU.

In one exemplary implementation, the cells 908 and 916 and optionally, additional cells between 908 and 916, connected in parallel may include cells constructed of lithium iron phosphate, as described above with respect to cell 512 of FIG. 5 to directly provide a 3.3V rail. Alternatively, with conventional 3-4.2V cells, the cells 908 and 916 connected in parallel may be configured to provide a voltage output of 3V to 4.2V to a load, either directly or through a voltage regulator (not shown).

The cells of the battery pack 900 may be configured in groups with a first group of cells including cells 902, 904 and 906, a second group of cells including cells 908 and 916, and a third group of cells including cells 910, 912 and 914. The battery pack 900 may include a balancer 924 to balance the charge within the first group of cells 902, 904 and 906. The battery pack 900 may include a balancer 926 to balance the charge within the third group of cells 910, 912 and 914.

The battery pack 900 also may include a balancer 928 to balance charge among the groups of cells. In this exemplary implementation, the balancer 928 may likely only need to transfer charge from either the first group of cells 902, 904 and 906 or the third group of cells 910, 912 and 914 to the second group of cells 908 and 916. In this manner, the balancer 928 may require buck only operation. The arrangement of cells in the groups with respect to one another may result in the need to transfer charge in only one direction such that the balancer 928 can be simplified to either a buck only or a boost only operation.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus, comprising:
a first cell subpack including a plurality of cells arranged in series; and
a second cell subpack connected in series to the first cell subpack, the second cell subpack including a plurality of cells arranged in series and at least one cell arranged in parallel with one of the plurality of cells, arranged in series, of the second cell subpack, wherein the first cell subpack and the second cell subpack use a first voltage rail to provide at least a first voltage level and a second voltage rail to provide a second voltage level, wherein the first voltage level is different from the second voltage level, and wherein the first voltage level is matched to an expected first load voltage level and the second voltage level is matched to an expected second load voltage level.

2. The apparatus of claim 1 wherein the second cell subpack includes multiple cells arranged in parallel with one of the plurality of cells, arranged in series, of the second cell subpack and the cells arranged in parallel match each other in battery chemistry and differ from each other in cell capacity.

3. The apparatus of claim 1 further comprising:
a first voltage regulator connected to the first cell subpack and the second cell subpack to regulate the first voltage level to match the expected first load voltage level; and
a second voltage regulator connected to the first cell subpack and the second cell subpack to regulate the second voltage level to match the expected second load voltage level.

4. The apparatus of claim 3 wherein:
the first voltage regulator comprises a boost voltage regulator to regulate the first voltage level to match an expected backlight unit voltage level; and
the second voltage regulator comprises a buck voltage regulator to regulate the second voltage level to match an expected universal serial bus (USB) voltage level.

5. The apparatus of claim 1 further comprising a balancer connected to the first cell subpack and the second cell subpack, the balancer configured to shuttle charge from the first cell subpack to the second cell subpack.

6. The apparatus of claim 1 wherein the first cell subpack provides the first voltage level and the second cell subpack provides the second voltage level independent of the first cell subpack.

7. The apparatus of claim 1 wherein the first cell subpack is configured operate in an operating mode and, at a same time, the second cell subpack is configured to operate in charging mode.

8. The apparatus of claim 1 wherein a cell within the first cell subpack charges one or more other cells within the first cell subpack.

9. The apparatus of claim 1 wherein a cell within the first cell subpack charges one or more other cells within the second cell subpack.

10. The apparatus of claim 1 further comprising a third cell subpack having a plurality of cells arranged in series and at least one cell arranged in parallel with one of the plurality of cells, arranged in series, of the third subpack, wherein the third cell subpack is connected in series to the first cell subpack and the second cell subpack and is configured to provide at least a third voltage level, wherein the third voltage level is different from the first voltage level and the second voltage level.

11. The apparatus of claim 10 further comprising:
a first balancer connected to the first cell subpack to transfer charge among the cells within the first cell subpack;
a second balancer connected to the second cell subpack to transfer charge among the cells within the second cell subpack; and
a third balancer connected to the third cell subpack to transfer charge among the cells within the third cell subpack.

12. The apparatus of claim 11 further comprising a fourth balancer connected to the first cell subpack, the second cell subpack and the third cell subpack, the fourth balancer configured to transfer charge between the first cell subpack, the second cell subpack and the third cell subpack.

13. An apparatus, comprising:
multiple cells arranged in series, the multiple cells configured to provide a first voltage level to a first load through a first voltage rail;
a voltage regulator connected to the first voltage rail, wherein the voltage regulator is charged by the multiple cells in series; and
at least one lithium ion cell connected to an output of the voltage regulator, the lithium ion cell having a battery chemistry different from the multiple cells arranged in series, wherein the voltage regulator is configured to charge the lithium ion cell.

14. The apparatus of claim 13 wherein the lithium ion cell is a lithium iron phosphate cell.

15. The apparatus of claim 13 wherein the voltage regulator is configured to charge the lithium ion cell only on demand at peak efficiency.

16. The apparatus of claim 13 wherein the lithium ion cell is configured to provide a second voltage level to at least a second load through a second voltage rail.

17. An apparatus, comprising:
a first cell subpack comprising multiple matched cells in series to provide a first voltage level; and a second cell subpack connected in series to the first cell subpack, the second cell subpack comprising multiple unmatched cells in parallel to provide a second voltage level, wherein the first voltage level is different from the second voltage level and the unmatched cells in parallel have a same cell chemistry.

18. The apparatus of claim 17 wherein charge is transferred between the first cell subpack and the second cell subpack to recharge the second cell subpack from the first cell subpack.

19. The apparatus of claim 17 wherein the first cell subpack operates independent from the second cell subpack.

* * * * *